United States Patent [19]

Ise et al.

[11] Patent Number: 4,854,411
[45] Date of Patent: Aug. 8, 1989

[54] DEVICE FOR DETERMINING WHETHER A MOTOR VEHICLE IS ON AN UPHILL ROAD UPON STARTING OF THE VEHICLE

[75] Inventors: Kiyotaka Ise, Susono; Sinichi Matsumoto; Hiroharu Miyazaki, both of Toyota, all of Japan

[73] Assignee: Toyota Jidosha Kabushiki Kaisha, Aichi, Japan

[21] Appl. No.: 165,291

[22] Filed: Mar. 8, 1988

[30] Foreign Application Priority Data

Mar. 10, 1987 [JP] Japan .................. 62-55080

[51] Int. Cl.$^4$ ............................. B60K 28/16
[52] U.S. Cl. .................... 180/197; 180/284
[58] Field of Search ............ 180/197, 170, 177, 179, 180/282, 284, 285, 233, 248; 280/6 R, 707; 364/424, 426, 431.01, 431.03, 433, 434; 503/100, 103, 109; 340/52 R, 66; 192/1.23, 1.24; 188/181 A

[56] References Cited

U.S. PATENT DOCUMENTS

| | | | |
|---|---|---|---|
| 4,674,049 | 6/1987 | Kubo | 364/426 |
| 4,717,207 | 1/1988 | Kubota | 364/426 |
| 4,725,102 | 2/1988 | Ando | 188/181 A |
| 4,736,814 | 4/1988 | Yogo | 180/197 |
| 4,739,856 | 4/1988 | Inagaki | 364/426 |

FOREIGN PATENT DOCUMENTS

| | | | |
|---|---|---|---|
| 86512 | 6/1983 | Japan . | |
| 60331 | 3/1986 | Japan | 180/285 |
| 235230 | 10/1986 | Japan | 180/285 |
| 29428 | 2/1987 | Japan | 180/197 |
| 32231 | 2/1987 | Japan . | |

Primary Examiner—Charles A. Marmor
Attorney, Agent, or Firm—Oliff & Berridge

[57] ABSTRACT

The device has a first detecting device for detecting a running speed of the vehicle, a second detecting device for detecting a specific point of time during a starting period of the vehicle, and a judging device for comparing the running speed of the vehicle detected by the first detecting device, with a predetermined threshold value, when the specific point of time is detected by the second detecting device. The judging device determines that the vehicle is on the uphill road, if the detected running speed is lower than the predetermined threshold value.

5 Claims, 8 Drawing Sheets

FIG.4

| | $\alpha_r < G1$ (−5m/s²) | $G1 \leq \alpha_r < G2$ (+5m/s²) | $G2 \leq \alpha_r$ |
|---|---|---|---|
| $V_r \geq V2$ (2km/h) | H (HOLD) | FU (FAST INCREASE) | |
| $V2 > V_r \geq V1$ (1km/h) | SD (SLOW DECREASE) | SU (SLOW INCREASE) | SU (SLOW INCREASE) |
| $V1 > V_r$ | FD (FAST DECREASE) | SD (SLOW DECREASE) | |

FIG.5

| | $\alpha_r < G1$ ($-3m/s^2$) | $G1 \leq \alpha_r < G2$ (+10m/s²) | $G2 \leq \alpha_r$ |
|---|---|---|---|
| $Vr \geq V2$ (6km/h) | SD (SLOW DECREASE) | SU (SLOW INCREASE) | FU (FAST INCREASE) |
| $V2 > Vr \geq V1$ (3km/h) | FD (FAST DECREASE) | SD (SLOW DECREASE) | |
| $V1 > Vr$ | FD (FAST DECREASE) | | |

DEVICE FOR DETERMINING WHETHER A MOTOR VEHICLE IS ON AN UPHILL ROAD UPON STARTING OF THE VEHICLE

BACKGROUND OF THE INVENTION

1. Field of the Invention

The present invention relates to an uphill-road detecting device for an automotive vehicle, which is adapted to determine that the vehicle is on an uphill road upon starting of the vehicle.

2. Discussion of the Prior Art

In controlling a motor vehicle, there may arise a need to determine whether the vehicle is on an uphill road. An example of an uphill-road detector is disclosed in Laid-open Publication No. 58-86512 (published in 1983) of a Japanese Utility Model Application. This detector uses a weight which is supported pivotally in a vertical plane parallel to a running direction of the vehicle. An uphill road on which the vehicle is placed can be sensed by detecting an angle of the pivotable weight with respect to the body of the vehicle.

While the detector indicated above is capable of detecting an uphill road with comparatively high accuracy while the vehicle is at a stop, the detector is easily affected by vibrations of the vehicle body and tends to suffer from comparatively low detecting accuracy while the vehicle is running. Further, this type of detector is relatively complicated in construction and accordingly expensive.

SUMMARY OF THE INVENTION

It is therefore an object of the present invention to provide an uphill-road detecting device for a motor vehicle, which permits improved detecting accuracy and is simple in construction and economical to manufacture.

The above object can be attained according to the principle of the present invention, which provides a device for determining whether a motor vehicle is on an uphill road upon starting of the vehicle, comprising: vehicle-speed detecting means for detecting a running speed of the vehicle; timing detecting means for detecting a specific point of time during a starting period of the vehicle; and judging means for comparing the running speed of the vehicle detected by the vehicle-speed detecting means, with a predetermined threshold value, when the timing detecting means has detected the specific point of time. If the detected running speed of the vehicle is lower than the predetermined threshold value, the judging means determines that the vehicle is placed on an uphill road.

Starting a vehicle on an uphill road to run up the slope is more difficult than starting the vehicle on a flat or level road. Therefore, the uphill road on which the vehicle is started can be recognized by detecting a running speed of the vehicle at a given point of time during a starting period of the vehicle.

Since the vehicle-speed detecting means is less likely to be affected by the vehicle body vibrations, the accuracy of detecting an uphill road is relatively high. Further, a speed detector, which is provided on almost all types of motor vehicles, can be utilized as the vehicle-speed detecting means of the instant device, and the timing detecting means and the judging means can be provided by adding a simple electronic circuit or computer program to the control system of the vehicle. Accordingly, the present device is available at a relatively low cost.

Where the vehicle is equipped with an anti-slip control device for preventing an excessive amount of slip of a drive wheel during acceleration of the vehicle, by lowering a rotating speed of the drive wheel when the amount of slip of the drive wheel exceeds a predetermined value during the starting period, the timing detecting means may be adapted to detect a first point of time when the speed of the drive wheel begins to be lowered by an operation of the anti-slip control device. Namely, the vehicle speed detected at this point of time is relatively highly proportional to the gradient or slope of the road on which the vehicle has been started. Hence, the determination of whether the vehicle has been started on an uphill road can be made with relatively high reliability, based on the vehicle speed detected when the drive wheel speed begins to fall for the first time after the anti-slip control device is activated.

Alternatively, the timing detecting means may be adapted to detect a predetermined time lapse after commencement of an operation of the anti-slip control device.

In a further form of the invention, the timing detecting means is adapted to detect a predetermined time lapse after commencement of a depressing action of the accelerator pedal.

The vehicle-speed detecting means may be adapted to determine the running speed of the vehicle, based on a rotating speed of an idler wheel of the vehicle.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 4 and 5 are views indicating an uphill-road control table and a flat-road control table which are stored in the ROM and used in the control program of FIG. 3 for regulating a brake pressure to be applied to the drive wheels by the anti-slip control device;

DETAILED DESCRIPTION OF THE PREFERRED EMBODIMENTS

Figure 1:
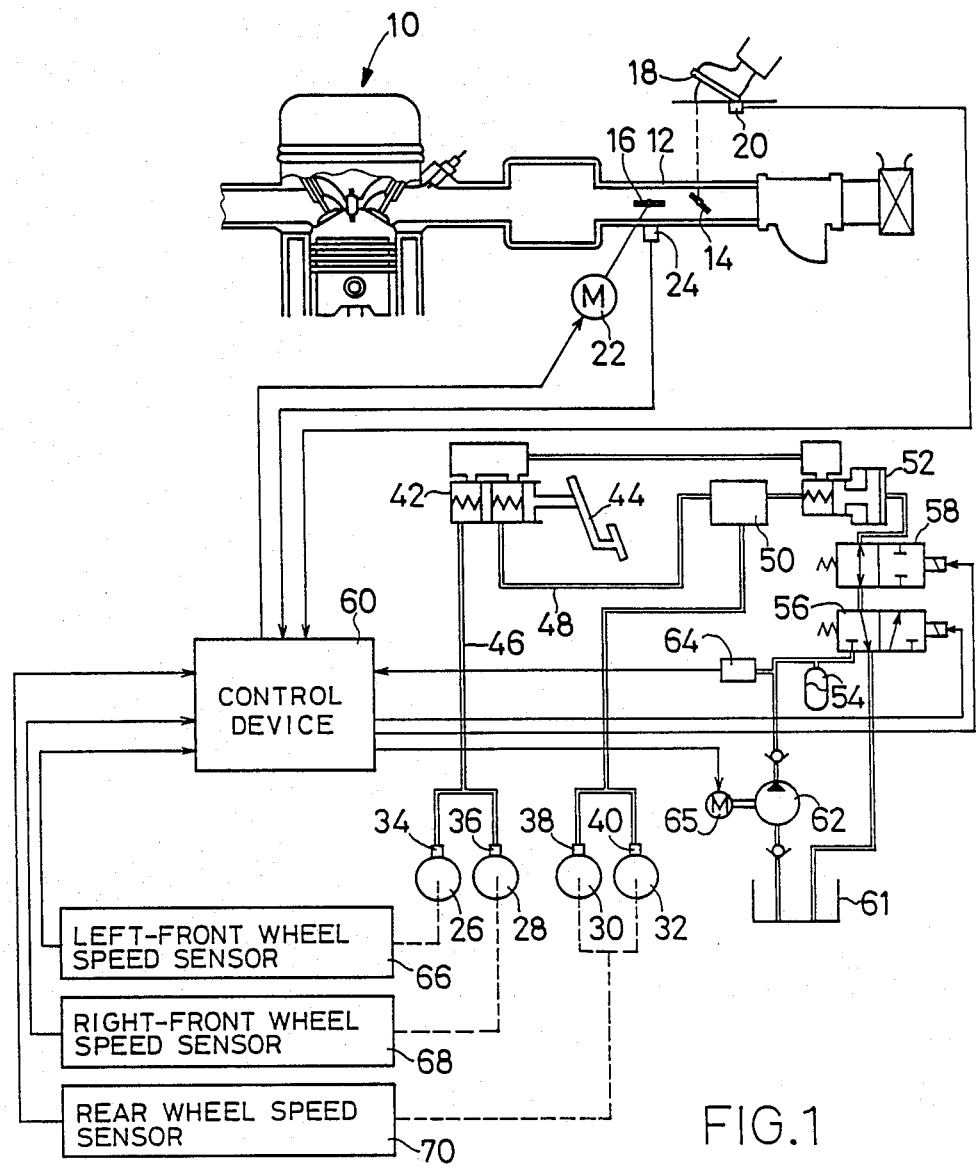
FIG. 1 is a schematic diagram showing an example of an anti-slip control device for drive wheels of a vehicle which incorporates one embodiment of an uphill-road detecting device of the present invention.

Referring first to FIG. 1, there is shown the uphill-road detecting device according to one embodiment of the invention, which is used to enable the anti-slip control device of the vehicle to operate in different modes depending upon whether the vehicle is started on an uphill road or on a level road. In the motor vehicle equipped with this anti-slip control device, the front wheels are idler wheels while the rear wheels are drive wheels. The anti-slip control deice includes means for reducing an output torque of an engine of the vehicle, as well as a hydraulically operated braking device, in order to lower the rotating speed of the drive wheels, as described below.

In FIG. 1, reference numeral 10 designates the engine of the vehicle equipped with an intake manifold 12 in which a main throttle valve 14 and an auxiliary throttle valve 16 are disposed in series. The output torque of the engine 10 is adjusted by controlling the opening angles of these throttle valves 14, 16. The main throttle valve 14 is adjusted in response to a depressing action on an accelerator pedal 18. The amount of depression of the accelerator pedal 18 is detected by an acceleration sensor 20. The auxiliary throttle valve 16 is operated by an auxiliary throttle control motor 22, and the opening angle of the auxiliary throttle valve 16 is detected by an auxiliary throttle sensor 24.

In the lower part of FIG. 1, there are shown left and right front wheels 26, 28, and left and right rear wheels 30, 32. The rear wheels 30, 32 are connected to the engine 10 via a power transmitting mechanism not shown, so that the rear wheels are driven by the engine 10. The front and rear wheels 26, 28, 30, 32 are provided with hydraulically operated wheel brakes 34, 36, 38, 40, respectively, which are operated by fluid pressures supplied from a main master cylinder 42. The main master cylinder 42 has two mutually independent pressure chambers which produce fluid pressures having the same level, when a brake pedal 44 is depressed. The fluid pressure produced in one of the two pressure chambers is applied to the front wheel brakes 34, 36 through a fluid passage 46, while the fluid pressure produced in the other pressure chamber is applied to the rear wheel brakes 38, 40 through a fluid passage 48.

In the fluid passage 48, there is provided a changeover valve 50 to which are connected in parallel the main master cylinder 42 and an auxiliary master cylinder 52. The changeover valve 50 is adapted to feed the rear wheel brakes 38, 40 with a higher one of the fluid pressures produced by the main and auxiliary master cylinders 42, 52.

The auxiliary master cylinder 52 is operated by a fluid supplied from an accumulator 54 via solenoid-operated directional control valve 56 and flow control valve 58. The directional control valve 56 is operated under the control of a control device 60, to effect fluid communication of the auxiliary master cylinder 52 selectively with the accumulator 54 and a reservoir 61, so that the fluid pressure delivered from the auxiliary master cylinder 52 to the rear wheel brakes 38, 40 are increased or decreased. The flow control valve 58 is also controlled by the control device 60, which controls the duty cycle of an electric current to be applied to the solenoid of the valve 58 so that the fluid flow through the valve 58 is changed in two steps, to thereby permit the pressure in the auxiliary master cylinder 52 to be increased or decreased at two different rates. With the flow control valve 58 continuously energized, the pressure in the auxiliary master cylinder 52 is maintained.

The accumulator 54 is adapted to store the pressurized fluid which is pumped from the reservoir 61 by a pump 62. The pressure in the accumulator 54 is detected by a pressure sensor 64 whose output is applied to the control device 60. A pump motor 65 to drive the pump 62 is turned on and off by the control device 60, according to the output of the sensor 64, so that the pressure in the accumulator 54 is maintained within a predetermined range.

Speed sensors 66, 68 are provided to detect the rotating speeds of the left and right front wheels 26, 28, respectively, and a speed sensor 70 is provided to detect the rotating speeds of the left and right rear wheels 30, 32. The speed sensor 70 detects the speeds of the rear wheels 30, 32, based on a rotating speed of an output shaft of a transmission disposed between the engine 10 and the rear wheels 30, 32. These speed sensors 66, 68, 70 are connected to the control device 60.

Figure 2:
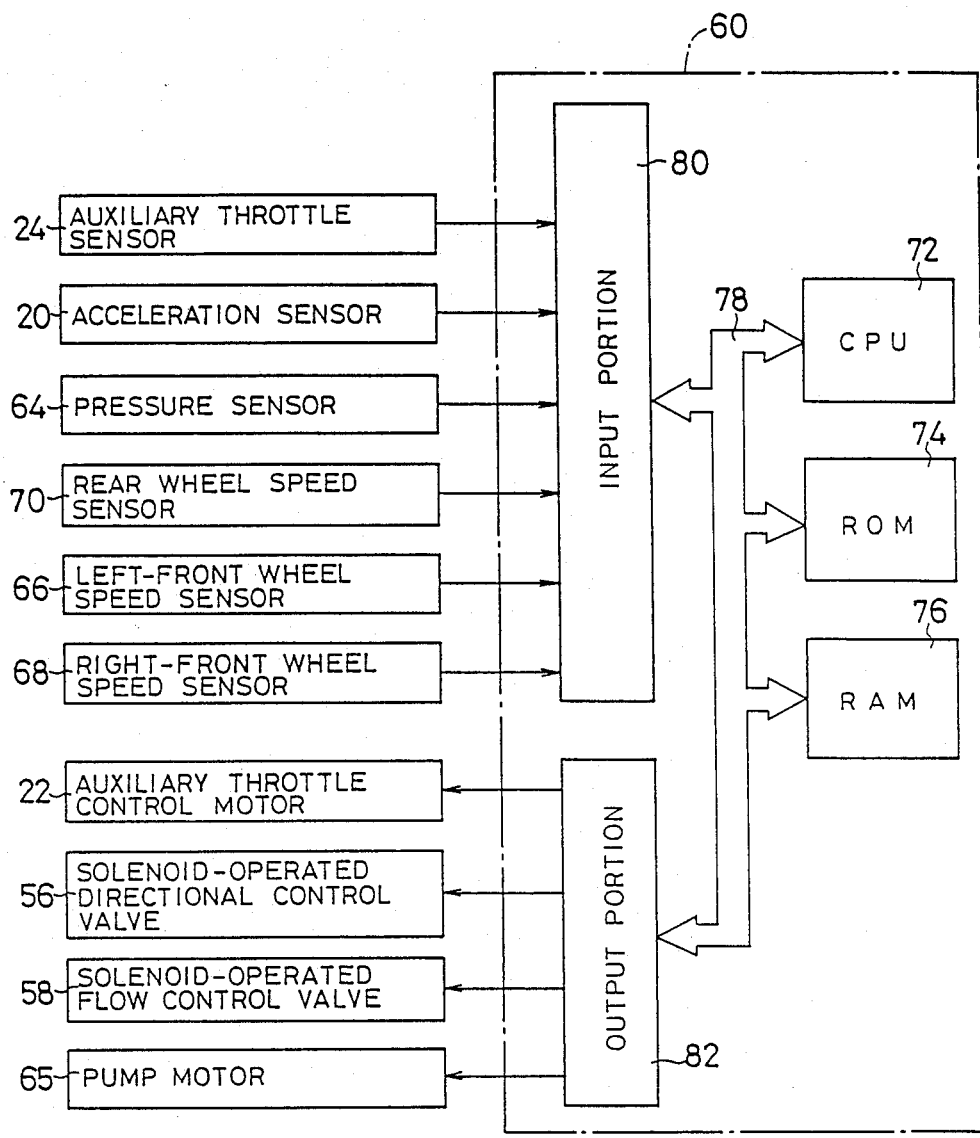
FIG. 2 is a schematic block diagram showing details of a control system of the anti-slip control device of FIG. 1.

Referring next to FIG. 2, the control device 60 is principally constituted by a computer which includes a central processing unit (CPU) 72, a read-only memory (ROM) 74, a random-access memory (RAM) 76, and a data bus 78. The computer receives through its input portion 80 the outputs of the various sensors 20, 24, 64, 66, 68 and 70 described above, and controls through its output portion 82 the auxiliary throttle control motor 22, solenoid-operated direction and flow control valves 56, 58 and pump motor 65.

Figure 3:
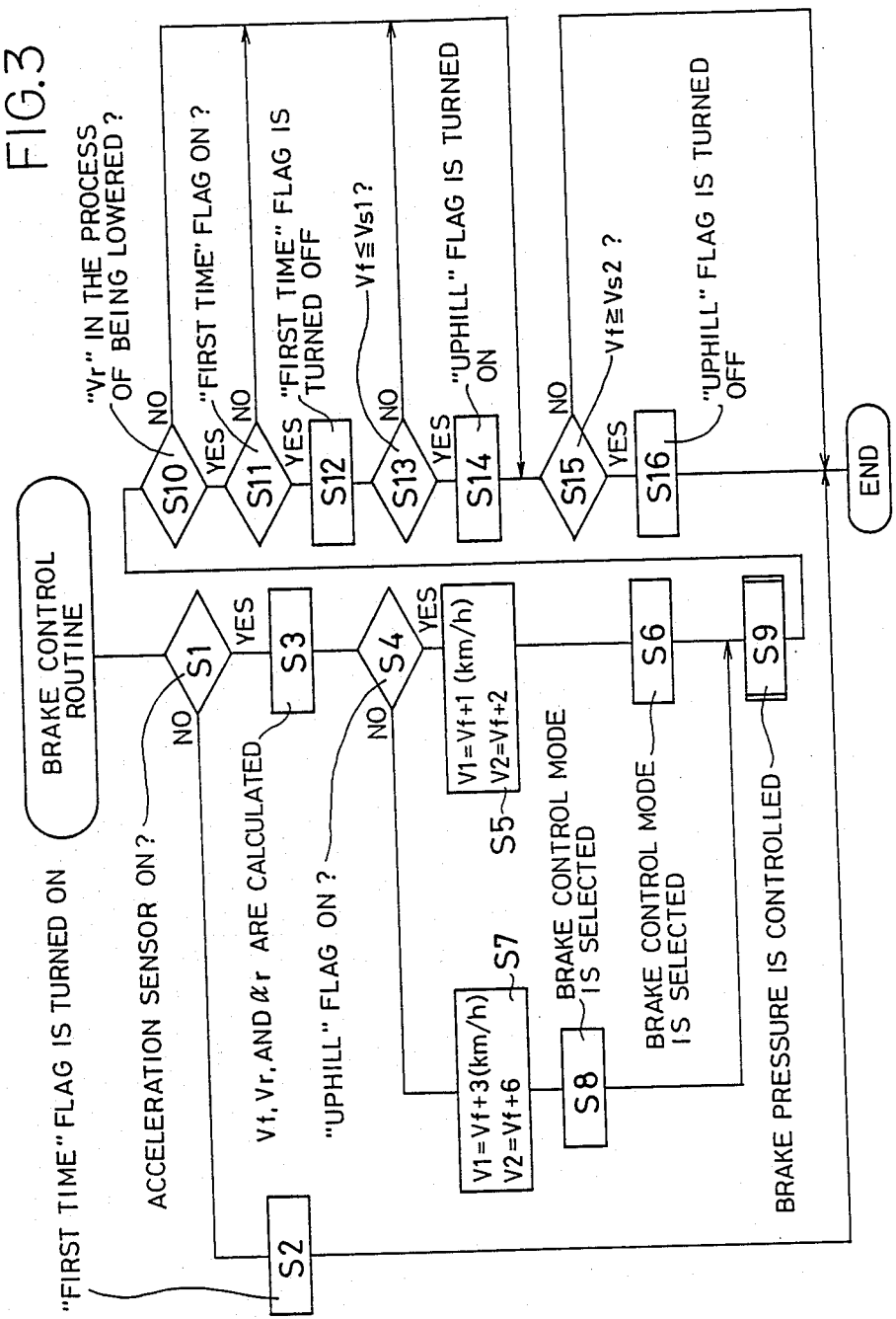
FIG. 3 is a flow chart showing a control program stored in a ROM of the control system of FIG. 2, which is closely associated with the principle of the present invention.

The ROM 74 stores various control programs including a brake control routine shown in FIG. 3, and an uphill-road control table and a flat-road control table which are shown in FIGS. 4 and 5, respectively. As described later in detail, each of these control tables is used to control the fluid pressure in the rear wheel brakes 38, 40 in different control modes depending upon whether the vehicle is started on an uphill road or on a level road.

An example of an anti-slip control operation of the drive wheels 38, 40 by the anti-slip control device constructed as described above is illustrated in the graph of FIG. 6. When the opening Y of the main throttle valve 14 is increased by depression of the accelerator pedal 18 as indicated in broken line in the middle of FIG. 6, the running speed Vf of the vehicle (average speed of the front wheels 26, 28) is increased as indicated in the lower part of FIG. 6. At this time, a first reference speed V1 and a second reference speed V2 are determined such that these speeds V1, V2 are higher than the detected running speed Vf by predetermined different values. When the speed Vr of the rear drive wheels 30, 32 exceeds the first reference speed V1, the opening β of the auxiliary throttle valve 16 is reduced to lower the output of the engine 10, so that the speed Vr of the rear wheels substantially coincides with the first reference speed V1. If the speed Vr of the rear drive wheels 30, 32 exceeds the second reference speed V2, a fluid pressure Pr is applied to the rear wheel brakes 38, 40, whereby brake is applied to the rear wheels 30, 32. In the present embodiment, the auxiliary throttle valve 16, auxiliary throttle control motor 22, etc. constitute primary anti-slip control means for lowering the rotating speed of the drive wheels 30, 32, while the hydraulic rear wheel brakes 38, 40 constitute auxiliary anti-slip control means for lowering the speed of the drive wheels. This arrangement permits reduction of the speed Vr of the drive wheels, while saving the energy of the engine 10 and minimizing the shortening of life expectancy of the friction members of the brakes 38, 40.

Figure 6:
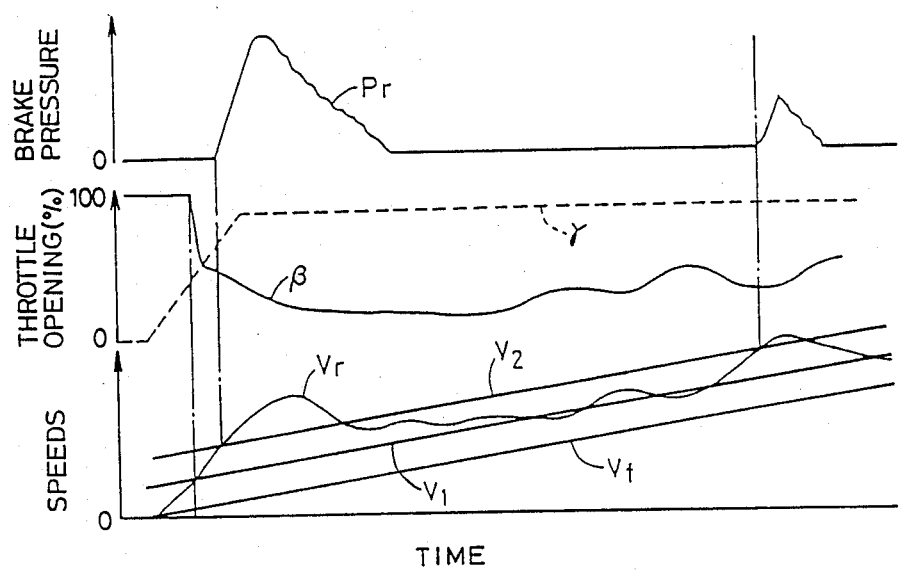
FIG. 6 is a graphical representation illustrating an example of an anti-slip control operation of the anti-slip control device.

As is apparent from FIG. 6, the auxiliary throttle valve 16 is rapidly rotated in a direction toward its fully closed position as soon as the running speed Vr of the vehicle exceeds the first reference speed V1. After the opening β of the auxiliary throttle valve 16 becomes equal to the opening γ of the main throttle valve 14, the valve 16 then slowly rotated toward the fully closed position. The opening of the auxiliary throttle valve 16 is increased when the speed Vr of the rear wheels 30, 32 becomes lower than the first reference speed V1, and decreased when the speed Vr becomes higher than the first reference speed V1. Since this control operation is not directly concerned with the principle of the present invention, no further details are provided herein.

Referring back to the flow chart of FIG. 3, there will be described in detail a control operation of the hydraulic brake system in different modes depending upon the output of the uphill-road detecting device according to the present invention, which indicates whether the vehicle is on an uphill road or a level road.

While a specific key switch provided on the vehicle is held on, the computer of the control device 60 executes the brake control routine of FIG. 3 at a predetermined time interval, for example, every 5 msecs. In this brake control routine, step S1 is initially executed to determine whether the accelerator pedal 18 has been depressed, or not. If the pedal 18 has not been depressed, this means that the vehicle is not in an acceleration mode. In this case, a brake control cycle is completed with only step S2 being executed to turn on a "FIRST TIME" flag, and with the other steps being skipped.

When the accelerator pedal 18 is operated, step S1 is followed by step S3 wherein the CPU 72 calculates the vehicle speed Vf, speed Vr of the rear wheels 30, 32, and a rate of acceleration αr of the rear wheels. The vehicle speed Vf is calculated as an average speed of the left and right front wheels 26, 28, and the speed Vr and acceleration rate αr of the rear drive wheels 30, 32 are calculated based on the output signal of the rear wheel speed sensor 70.

The control flow then goes to step S4 to determine whether an "UPHILL" flag is on or not. If an affirmative decision (YES) is obtained in step S4, the control flow goes to steps S5 and S6. Since the "UPHILL" flag was turned off in an initializing routine implemented upon application of power to the control device 60, a negative decision (NO) is obtained in step S4 at this point of time. Therefore, steps S7 and S8 are executed. In step S7, the first and second reference speeds V1 and V2 are calculated by adding predetermined values, e.g., 3 km/h and 6 km/h, to the vehicle speed Vf calculated in step S3. In step S8, one of a plurality of pressure control modes is selected based on the first and second reference speeds V1, V2, and the speed Vr and acceleration rate αr of the rear wheels 30, 32 calculated in step S3, and according to the flat-road control table shown in FIG. 5. Since the rear wheel speed Vr is lower than the first reference speed V1 and the accleration rate αr is almost zero immediately after the depression of the accelerator pedal 18, a fast pressure decrease mode (FD) is selected according to the flat-road control table of FIG. 5. Consequently, the solenoid-operated directional control valve 56 is held deenergized, while the solenoid-operated flow control valve 58 is energized with an electric current having a low duty cycle, whereby the auxiliary master cylinder 52 is held in communication with the reservoir 61, with no fluid pressure applied to the rear wheel brakes 38, 40.

In the next step S10, the CPU 72 determines whether the rear wheel speed Vr is being lowered or not. In an early period of the control operation initiated by the depression of the accelerator pedal 18, the speed Vr is not being lowered, and a negative decision is obtained in step S10. Therefore, the control flow goes to step S15, while skipping steps S11 through S14. In step S15, the CPU 72 determines whether the vehicle speed Vf calculated in step S3 exceeds a second predetermined value Vs2, e.g., 5 km/h, or not. Since a negative decision is obtained in step S15 in the early period of operation, the next step S16 is skipped, and one control cycle of the brake control routine is terminated.

As the above control cycle is repeatedly executed, the rear wheel speed Vr becomes higher than the second reference speed V2 as indicated in FIG. 6. At this point of time, the acceleration rate αr of the rear wheels 30, 32 is usually higher than a second predetermined reference G2. Accordingly, a fast pressure increase mode (FU) is selected in step S8, whereby, in step S9, the directional control valve 56 is switched to effect fluid communication between the auxiliary master cylinder 52 and the accumulator 54, and the flow control valve 58 is energized with an electric current having a comparatively low duty cycle. In consequence, the brake pressure in the rear wheel brakes 38, 40 is rapidly increased.

As a result, the rotating speed of the rear wheels 30, 32 is lowered, and the acceleration rate αr of the rear wheels eventually becomes lower than the second predetermined reference G2. Consequently, a slow pressure increase mode (SU) is selected in step S8. Accordingly, the duty cycle of the electric current applied to the flow control valve 58 is lowered in step S9, so that the rate of increase in the fluid pressure in the rear wheel brakes 38, 40 is lowered. When the acceleration rate αr thereafter becomes lower than a first predetermined reference G1 which is a negative value, a slow pressure decrease mode (SD) is selected in step S8, whereby the directional control valve 56 is deenergized and the flow control valve 58 is energized with an electric current having a comparatively high duty cycle, so that the fluid pressure in the rear wheel brakes 38, 40 is slowly decreased in step S9.

If the acceleration rate αr becomes a negative value, the rear wheel speed Vr begins to be lowered, whereby an affirmative decision (YES) is obtained in step S10. In the next step S11, the CPU 72 determines whether the "FIRST TIME" flag is on, or not. Since this flag was turned on in step S2 previously implemented, an affirmative decision is obtained in step S12, and the step is followed by step S12 in which the "FIRST TIME" flag is turned off. Then, in step S13, the CPU 72 determines whether the vehicle speed Vf is lower than a first predetermined speed Vs1, for example, 1 km/h. Usually, the vehicle speed Vf at this point of time exceeds 2 km/h where the vehicle is started on a level road, but the speed Vf is below this value (first predetermined value Vs1) where the vehicle is-started on an uphill road to run up the slope. Therefore, it is possible to determine whether the road on which the vehicle has been started is an uphill road or not, by determining whether the vehicle speed Vf at this point of time exceeds the first predetermined value Vs1 or not. If an affirmative decision is obtained in step S13, the control flow goes to step S14 to turn on the "UPHILL" flag, which indicates that the brake pressure in the rear wheel brakes 38, 40 should be controlled in the uphill-road mode, according to the uphill-road control table of FIG. 4.

In the next control cycle of the brake control routine, an affirmative decision is obtained in step S4, and steps S5 and S6 are implemented. In step S5, the first and second reference speeds V1 and V2 are calculated by adding to the detected vehicle speed Vf suitable values, e.g., 1 km/h and 2 km/h, respectively, which are smaller than those added in the corresponding step S7 in the flat-road mode. In step S6, one of a plurality of pressure control modes is selected according to the uphill-road control table indicated in FIG. 4. The uphill-road control table represents pressure regulating commands which are indicative of higher brake pressures, than the corresponding commands represented by the flat-road control table of FIG. 5. Namely, the first and second reference speeds V1 and V2 determined in step S5 in the uphill-road control mode are lower than those determined in the corresponding step S7 in the flat-road control mode, and the pressure control mode selected in step S6 permits higher brake pressures than the mode selected in the corresponding step S8. Accordingly, the slip ratio of the left and right rear drive wheels 30, 32 is controlled to be a lower value when the vehicle is started on an uphill road, than when the vehicle is started on a level road.

Figure 7:
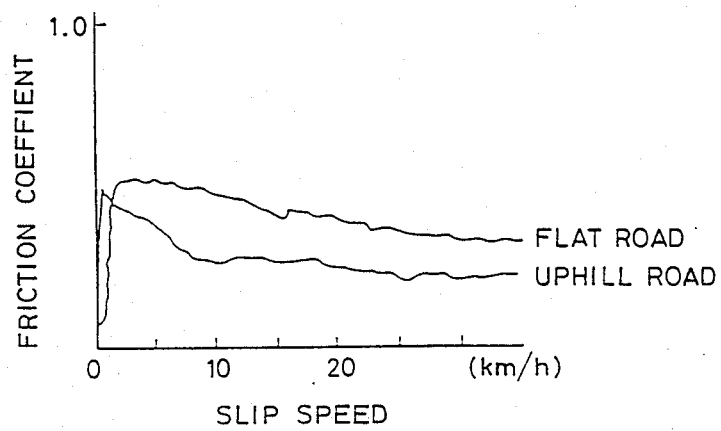
FIG. 7 is a graph for explaining the reason for controlling a slip ratio of the drive wheels to a lower value when the vehicle is on an uphill road, than on a flat or level road.

The graph in FIG. 7 shows a slip amount (slip speed km/h) of the rear drive wheels 30, 32 measured upon starting of the vehicle on a snow-covered level road and a snow-covered 6°-uphill road, in relation to a measured friction coefficient between the drive wheels and the road surfaces. It follows from the graph that the friction coefficient is smaller on the uphill road than on the level road, even if the slip amount is the same on the uphill and level roads. It is presumed that since the drive wheels of a vehicle more easily slip on the surface of an uphill road than on the surface of a level road, the uphill road surface tends to be more heavily polished taan the level road surface. Therefore, in order to achieve a good start of the vehicle on the uphill road surface, the slip ratio of the drive wheels should be held at a lower value than on the level road surface, because of a comparatively lower friction coefficient on the uphill road surface than on the level road surface. For this reason, the first and second reference speeds V1 and V2 used in the uphill-road control mode should be lower than those used in the flat-road control mode, so that the slip speed of the drive wheels is maintained at a lower level when the vehicle is started on the uphill road.

Although the flat-road control table of FIG. 5 may be used to control the brake pressure for the drive wheels during starting of the vehicle on an uphill road, experiments proved better results in the case where the pressure control operation is effected according to the uphill-road control table of FIG. 4, which generally requires higher brake pressures to be applied to the rear brakes 38, 40 when the vehicle is started on the uphill road. In this sense, the use of the two different pressure control tables depending upon the road surface inclination according t the present invention is significant in controlling the start operations of the vehicle.

In step S11, implemented after steps S5 and S6 are executed in the last control cycle, a negative decision is obtained since the "FIRST TIME" flag was turned off in step S12 in the last control cycle. Consequently, steps S12 through S14 are skipped, and the "UPHILL" flag is held on, whereby the brake pressure for the rear wheel brakes 38, 40 is continuously controlled in the uphill-road mode, i.e., according to the uphill-road control table of FIG. 4.

During the brake pressure control in the uphill-road mode, the vehicle speed Vf is gradually increased and eventually exceeds the second predetermined value Vs2, whereby an affirmative decision (YES) is obtained in step S15. The control flow then goes to step S16 to turn off the "UPHILL" flag. Therefore, a negative decision (NO) is obtained in step S4 in the next control cycle of the brake pressure control routine, and thereafter steps S7 and S8 are implemented to control the brake pressure in the flat-road mode according to the control table of FIG. 5. This means that the flat-road control table is used after the vehicle started on the uphill road has been sufficiently accelerated, since controlling of the drive wheels so as to permit a higher slip ratio is required to assure better drivability of the vehicle after the vehicle speed Vf becomes higher than a certain higher level, i.e., second predetermined value Vs2.

As described above, the hydraulically operated rear wheel brakes 38, 40 are controlled in the uphill-road mode if the vehicle speed Vf is lower than the first predetermined value Vs1 when the speed Vr of the drive wheel begins to be lowered for the first time due to the activation of the anti-slip control device. Where the vehicle is started on a level road, the vehicle speed Vf is higher than the first predetermined value Vs1 when the speed Vr of the drive whel begins to be lowered for the first time, whereby the decision obtained in step S13 at this point of time is negative, and step S14 is not executed. In this case, therefore, the "UPHILL" flag is not turned on, and the decision in step S4 in the next control cycle is also negative. Thus, the brake pressure control operation is performed in the flat-road mode according to the control table of FIG. 5, from the beginning of the brake control routine.

It follows from the foregoing description of the present embodiment that the front wheel speed sensors 66, 68, and the portion of the computer of the control device 60 for executing step S3 of FIG. 3 constitute vehicle-speed detecting means for detecting the vehicle speed Vf, and that the portion of the computer for executing step S10 of FIG. 3 constitutes timing detecting means for detecting a specific point of time at which the vehicle speed Vf is compared with the first predetermined value Vs1. Further, the portion of the computer for executing steps S11 through S14 constitutes judging means for determining that the vehicle is on an uphill road. The first predetermined value Vs1 is used as a threshold value with which the vehicle speed Vf is compared by the judging means.

In the illustrated embodiment, the determination as to whether the vehicle is started on an uphill or level road is made based on the vehicle speed at the moment when the speed of the drive wheels begins to be lowered for the first time after an activation of the anti-slip control device due to an excessive slip ratio of the drive wheels. However, the specific point of time or moment at which the determination is made may be a moment of a predetermined time after the anti-slip control device is activated, as shown in the flow chart of FIG. 8, or alternatively a moment of a predetermined time after the accelerator pedal 18 is depressed, as shown in the flow chart of FIG. 9.

Figure 8:
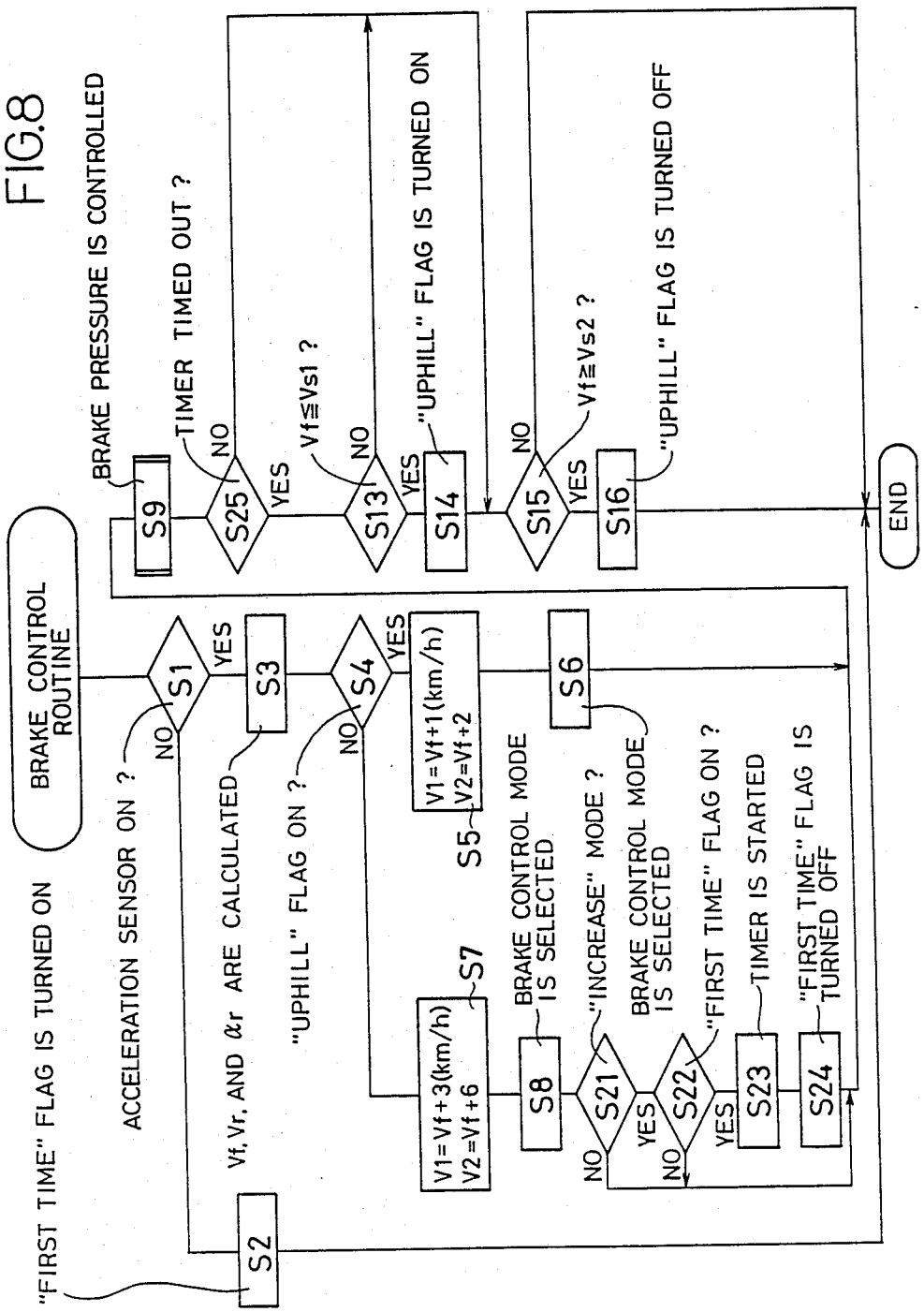
FIGS. 8 and 9 are flow charts corresponding to that of FIG. 3, showing modified embodiments of the present invention.

In the modified embodiment of FIG. 8, the activation of the anti-slip control device is detected in step S21 following step S8. That is, if a pressure increase mode is selected in step S8, an affirmative decision is obtained in step S21, and therefore step S22 is executed to determine whether the "FIRST TIME" flag is on or not. Since this flag was turned on in step S2 already executed, step S22 is followed by step S23 in which a timer is started. Then, step S24 is executed to turn off the "FIRST TIME" flag, and is followed by step S9 described above. Step S23 is provided to measure a predetermined time after the pressure increase mode is selected in step S8, i.e., after the anti-slip control device is activated. Step S9 is followed by step S25 to determine whether the predetermined time has lapsed, that is, whether the timer started in step S23 has been timed out, or not. Step S25 is followed by step S15 until an affirmative decision is obtained in step S25. In other words, when the predetermined time has lapsed after the pressure increase mode is selected to reduce the speed Vr of the drive wheels 30, 32, step S25 is followed by step S13 in which the determination as to the uphill and level roads is made, based on the current vehicle speed Vf and the threshold value Vs1.

Figure 9:
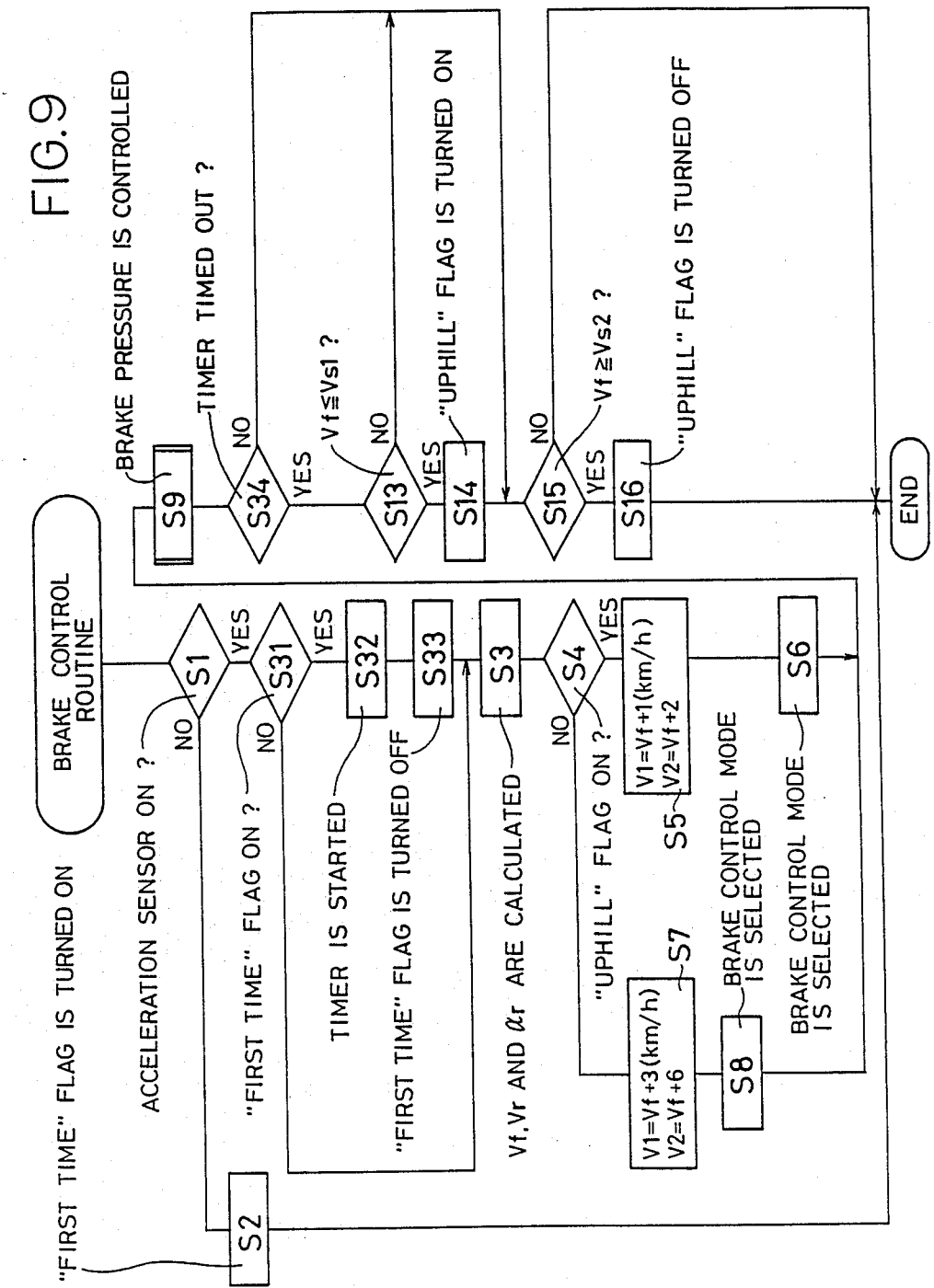

In the modified embodiment of FIG. 9, step S1 is followed by steps S31, S32 and S33 similar to steps S22-S24 of FIG. 8, if the accelerator pedal 18 is operated. Namely, the timer is started in step S32 to measure a time lapse after the depressing action on the pedal 18. The time lapse is checked in step S34 following step S9. Step S34 which corresponds to step S25 of FIG. 8 is followed by step S13 when the predetermined time has elapsed after the accelerator pedal 18 is depressed.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the scope of the invention defined in the following claims.

What is claimed is:

1. A device for determining whether a motor vehicle is on an uphill road upon starting of the vehicle, comprising:

vehicle-speed detecting means for detecting a running speed of the vehicle;

timing detecting means for detecting a specific point of time during a starting acceleration period of the vehicle in which the vehicle is continuously accelerated after the starting thereof; and judging means for comparing the running speed of the vehicle detected by said vehicle-speed detecting means, with a predetermined threshold value, when said timing detecting means detects said specific point of time, and determining that the vehicle is on the uphill road, if said detected running speed is lower than said predetermined threshold value.

2. A device according to claim 1 and for use on the vehicle which includes an anti-slip control device for preventing an excessive amount of slip of a drive wheel during acceleration of the vehicle, by lowering a rotating speed of said drive wheel when the amount of slip of said drive wheel exceeds a predetermined value during said starting period, wherein said timing detecting means detects a first point of time when the rotating speed of said drive wheel begins to be lowered by an operation of said anti-slip control device.

3. A device according to claim 1 and for use on the vehicle which includes an anti-slip control device for preventing an excessive amount of slip of a drive wheel during acceleration of the vehicle, by lowering a rotating speed of said drive wheel when the amount of slip of said drive wheel exceeds a predetermined value during said starting period, wherein said timing detecting means detects a predetermined time lapse after commencement and before termination of an operation of said anti-slip control device.

4. A device according to claim 1 and for use on the vehicle which includes an accelerator pedal, wherein said timing detecting means detects a predetermined time lapse after commencement of a depressing action of said accelerator pedal.

5. A device according to claim 1, wherein said vehicle-speed detecting means determines said running speed of the vehicle, based on a rotating speed of an idler wheel of the vehicle.

* * * * *